P. OSWALD.
Car-Couplings

No. 155,544. Patented Sept. 29, 1874.

WITNESSES:

INVENTOR:
Philip Oswald
BY
ATTORNEYS.

UNITED STATES PATENT OFFICE.

PHILIP OSWALD, OF SMITHSBURG, MARYLAND.

IMPROVEMENT IN CAR-COUPLINGS.

Specification forming part of Letters Patent No. 155,544, dated September 29, 1874; application filed August 10, 1874.

*To all whom it may concern:*

Be it known that I, PHILIP OSWALD, of Smithsburg, in the county of Washington and State of Maryland, have invented a new and Improved Car-Coupling; and I do hereby declare that the following is a full, clear, and exact description of the same, reference being had to the accompanying drawing, forming a part of this specification, in which—

Figure 1:
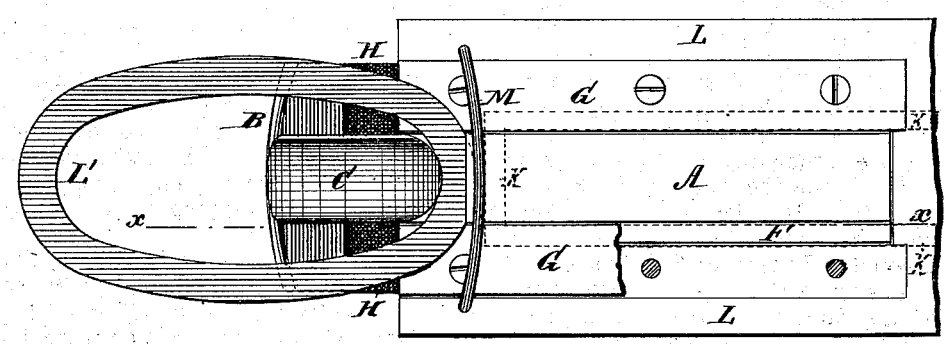
Figure 2:
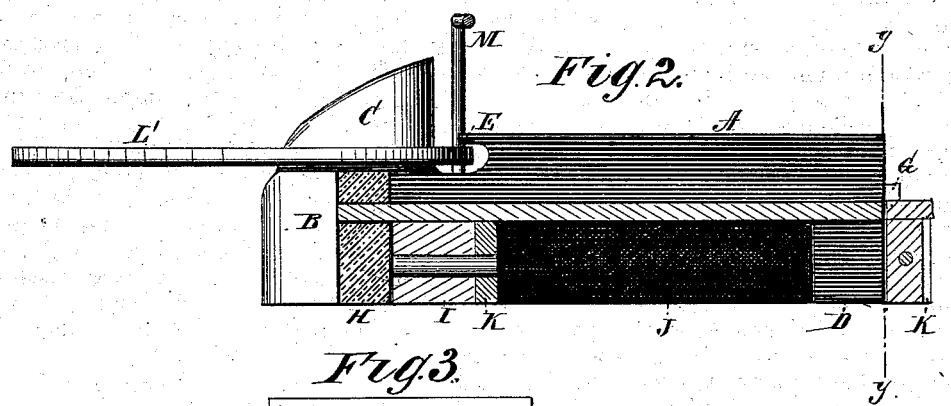
Figure 3:
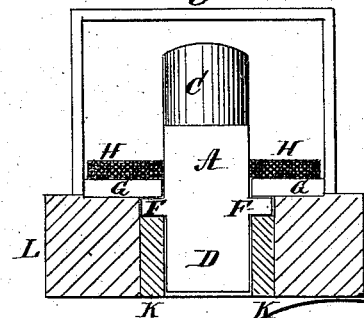

Fig. 1 is a plan view; Fig. 2, a longitudinal vertical section through line $x\,x$; Fig. 3, a sectional end view through line $y\,y$.

This invention relates to self-acting car-couplings, and is a new and improved arrangement that is adapted to the construction of any of the ordinary cars, is simple in design, substantial in its construction, and possesses, in consequence of the same, great durability. It consists of a draw-bar, having upon its upon its end an abutment which acts as a buffer, and an inclined hook over which a link passes when the coupling is effected and upon its rear end a downwardly-extending lug. Said abutment has behind it a cushion of rubber, held between the same and the bumping-sill of the car, and the said lug of the draw-bar presses against a rubber cushion in front of it, the same being disposed inside a clevis-shaped piece just in rear of the bumping-sill and securely bolted to the framework of the car upon the sides. Said draw-bar has upon each side a flange upon which rest longitudinal plates attached to the framework, by means of which the draw-bar is fastened to the same.

In the drawing, A represents the draw-bar, having upon its front end the abutment B and the curved inclined hook C, with a concave edge to receive and guide the link. D represents the lug on the under side of draw-bar, by means of which the traction is exerted. E is a ledge upon the middle portion of the draw-bar which projects over and fastens the link L′ when the coupling is complete. F is a flange on opposite sides of the draw-bar, upon which rest the plates G that fasten the same to the frame of the car. H is a rubber cushion, held between the abutment B and the bumping-sill I, which, with said abutment, forms a buffer to break the shock of the cars when coming together. J is a second rubber cushion, which rests in a seat in the clevis-shaped piece K, and against which the lug D presses in drawing the car. Said clevis-shaped is securely bolted just behind the bumping-sill to the inclosing-frame L of the car-frame, and to the latter is attached the bent rod M, which acts as a guard to prevent the link from slipping off the inclined face of the hook.

The operation of this coupling is as follows: The cars being constructed with my improved coupler, either one of the following methods may be adopted for automatically coupling the same. The link is placed upon its end in perpendicular position, or nearly so, and resting against the guard M. The car, now coming in contact with the one to be coupled, strikes with some shock against the buffer of the other and causes the link to fall forward over the hook and couple the same. Or, instead of having the link in a vertical position, it may be placed horizontally, with its end in the recess formed by the ledge E and rear of the hook, the other end being extended. Now, as it approaches the coupler on the next car, the link slides up the concave inclined face of the hook, and, passing over the same, catches it, the bent rod M serving to guide the link and keep it upon the concave face of the hook.

Having thus described my invention, what I claim as new is—

1. The draw-bar A, having the abutment B, the curved inclined concave-faced hook C, the traction-lug D, the ledge E, and flanges F, all combined substantially as and for the purpose specified.

2. The combination of the draw-bar A, the rubber cushions H and J, the clevis-shaped piece K, the plates G, the bumping-sill I, guard M, frame L and link L′, substantially as and for the purpose specified.

PHILIP OSWALD.

Witnesses:
W. A. RIDDLEMOSER,
W. V. HARNE.